US005499030A

United States Patent [19]
Wicks et al.

[11] Patent Number: 5,499,030
[45] Date of Patent: Mar. 12, 1996

[54] EXPERT SYSTEM CONSTANT FALSE ALARM RATE (CFAR) PROCESSOR

[75] Inventors: Michael C. Wicks, Utica; William J. Baldygo, Jr., Rome; Russell D. Brown, Holland Patent, all of N.Y.

[73] Assignee: The United States of America as represented by the Secretary of the Air Force, Washington, D.C.

[21] Appl. No.: 215,073

[22] Filed: Mar. 18, 1994

[51] Int. Cl.$^6$ .................................................. G01S 13/00
[52] U.S. Cl. ............................................. 342/93; 342/159
[58] Field of Search ............................ 342/93, 16, 159, 342/160, 162; 364/574

[56] References Cited

U.S. PATENT DOCUMENTS

| | | | |
|---|---|---|---|
| 3,995,270 | 11/1976 | Perry et al. | 342/93 |
| 4,749,994 | 6/1988 | Taylor, Jr. | 342/195 |
| 4,970,660 | 11/1990 | Marchant | 364/517 |
| 5,063,607 | 11/1991 | FitzHenry et al. | 382/50 |
| 5,075,856 | 12/1991 | Kneizys et al. | 364/420 |
| 5,093,665 | 3/1992 | Wieler | 342/26 |

OTHER PUBLICATIONS

Antonik et al, "Intelligent Use of CFAR Algorithms", AD-A267 755/7/XAB, Kaman Sciences Corp., Utica, N.Y. May 1993.
Antonik et al, Record of the 1993 IEEE National Radar Conference (Cat. No. 93CH3253-2), Lynnfield, Mass., Apr. 1993.

*Primary Examiner*—Ian J. Lobo
*Attorney, Agent, or Firm*—William G. Auton

[57] ABSTRACT

An artificial intelligence system improves radar signal processor performance by increasing target probability of detection and reducing probability of false alarms in a severe radar clutter environment. This utilizes advances in artificial intelligence and expert systems technology for the development of data analysis and information (signal) processors used in conjunction with conventional (deterministic) data analysis algorithms to combine radar measurement data (including observed target tracks and radar clutter returns from terrain, sea, atmospheric effects, etc.) with topographic data, weather information, and similar information to formulate optimum filter coefficients and threshold tests. Present fielded radar systems use one CFAR algorithm for signal processing over the entire surveillance volume. However, radar experiments have shown that certain CFAR algorithms outperform others in different environments. The system intelligently senses the clutter environment, and selects and combines the most appropriate CFAR algorithm(s) to produce detection decisions that will outperform a processor using a single algorithm. The invention provides for improved performance through the application of rule-based and data-based expert system computer software technology to CFAR signal processors, thereby improving target detection by reducing processing losses which result from a mismatch between the single, fixed CFAR processor and dynamically changing environment in which a radar must operate.

2 Claims, 9 Drawing Sheets

EXPERT SYSTEM CONSTANT FALSE ALARM RATE (CFAR) PROCESSOR

STATEMENT OF GOVERNMENT INTEREST

The invention described herein may be manufactured and used by or for the Government for governmental purposes without the payment of any royalty thereon.

BACKGROUND OF THE INVENTION

The present invention generally relates to constant false alarm rate (CFAR) signal processors, and in particular, to a CFAR which improves radar signal processor performance by increasing target probability of detection and reducing probability of false alarms in a severe radar clutter environment.

False alarms are a significant problem in wide area surveillance radar. The conflicting requirements for a high probability of detection and a low probability of false alarm are rarely met due to the dynamically changing environment. The typical assumption of a homogeneous, Gaussian, thermal noise like background is routinely violated due to the spatial variation in clutter characteristics and effects of clutter edges, discretes, and multiple targets. Many different CFAR algorithms have been developed to effectively deal with the various types of backgrounds that are encountered. However, any single algorithm is likely to be inadequate in a dynamically changing environment as described above. The approach suggested here is to intelligently select the CFAR algorithm or algorithms being executed at any given time, based upon the observed characteristics of the environment. This approach requires sensing the environment, employing the most suitable CFAR algorithms (s), and applying an appropriate multiple algorithm fusion scheme or consensus algorithm to produce a global detection decision.

Adaptive threshold techniques are usually employed to control false alarm rates in varying background environments. The most common of these techniques is Constant False Alarm Rate (CFAR) processing. CFAR processors are designed to maintain a constant false alarm rate by adjusting the threshold for a cell under test by estimating the interference in the vicinity of the test cell. A "cell" is a sample in the domains of interest (eg: range, Doppler, angle, polarization). In general the data operated on by the CFAR processor may be pre-filtered to improve detection performance. This pre-filtering may include Doppler filtering, adaptive space-time processing, pre-whitening, and channel equalization.

Constant False Alarm Rate (CFAR) signal processing for automatic detection radar is an important part of the system design problem. The classical theory is developed under the assumption that detection is to be performed for targets in the presence of stationary, Gaussian noise with known statistics, i.e. receiver noise. For ground-based radar systems looking high above the near-range clutter this was a valid assumption. For the case of modern, long-range, airborne surveillance radars, the situation is more complicated. The steep grazing angles associated with a look down radar produce far stronger clutter returns than those observed in any ground based radar, effectively masking targets flying above these clutter regions. Clutter changes dynamically as the platform moves such that the processor must effectively deal with clutter edges, discretes, multiple targets and non-Gaussian interference. The general theory for optimum detection in non-stationary, non-Gaussian clutter or interference is not well developed, even when the statistical properties of the environment are known. In an attempt to solve this problem, presently fielded radar systems employ canceller-based signal processing techniques which exploit anticipated differences between target returns and clutter. The classical techniques for automatic target detection in receiver noise are then employed. Non-zero clutter residues at the output of these canceller-based systems degrade the performance of classical detectors, and improved CFAR signal processing is required to achieve the desired probability of detection and probability of false alarm. Historically, the design of filters for clutter cancellation is performed separately from the design or CFAR signal processors. Consequently, detection performance will be suboptimum. Also, the selection of a single filter, and a single CFAR processor, to perform in all environments, will surely be mismatched to the ever changing radar returns, and will result in further degraded performance. The Expert System CFAR (ES-CFAR) Processor solves this problem by intelligently sensing the environment, employing one or more CFAR algorithms for data analysis, and combining results to make detection decisions.

The task of providing a CFAR processor that improves radar signal processor performance by increasing target probability of detection and reducing probability of false alarms in a severe radar clutter environment, is alleviated to some extent by the systems disclosed in the following U.S. patents, the disclosures of which are incorporated herein by reference:

U.S. Pat. No. 5,075,856 issued to Kneizys et al;

U.S. Pat. No. 5,093,665 issued to Wieler;

U.S. Pat. No. 5,063,607 issued to FitzHenry et al;

U.S. Pat. No. 4,970,660 issued to Marchant; and

U.S. Pat. No. 4,749,994 issued to Taylor.

The patent to Marchant discloses an accumulated statistics CFAR method and device using integrated data to maximize the probability of target detection for a given false alarm rate. The remaining patents are of interest, but do not disclose improving performance through the application of rule-based and data-based expert system computer software technology to CFAR signal processors, thereby improving target detection by reducing processing losses which result from a mismatch between the single fixed CFAR processor and the dynamically changing environment.

Constant False Alarm Rate (CFAR) processors were developed to maintain a constant average false alarm rate through adaptive threshold control while maintaining adequate target detection performance. The classical Cell Averaging (CA) CFAR processor assumes a homogeneous, Gaussian, thermal noise environment. It is, in fact, optimum under these conditions. However, in a wide area surveillance radar, these assumptions are routinely violated, presenting a variety of returns whose statistical characteristics are varied and unpredictable and quite unlike those of thermal noise, even after filtering. The resulting effect is such that conventional CA CFAR processing may generate excessive false alarms.

The present invention utilizes advances in artificial intelligence and expert systems technology for the development of data analysis and information (signal) processors used in conjunction with conventional (deterministic) data analysis algorithms to combine radar measurement data (including observed target tracks and radar clutter returns from terrain, sea, atmospheric effects, etc.) with topographic data, weather information, and similar information to formulate optimum filter coefficients and threshold tests. Present fielded radar systems use one CFAR algorithm for signal processing over the entire surveillance volume. However, radar experiments have shown that certain CFAR algorithms outperform others in different environments. The invention's system intelligently senses the clutter environment, selects and combines the most appropriate CFAR algorithm(s) to produce detection decisions that will outperform a processor using a single algorithm.

SUMMARY OF THE INVENTION

The present invention includes both a three-step process and an artificial intelligence system that may be used to suppress false alarms in data of interest. The process begins by collecting data with a sensor system which collects both said data of interest and environmental data. A suitable sensor system is described in the above cited Kneizys et al patent, in which a radar system would collect both radar data and the environmental data (of atmospheric transmittance and background radiance) using the LOWTRAN 7 system.

Next comes the first processing step which entails processing the environmental data to select a best CFAR analysis model from a stored library of CFAR models. This represents the artificial intelligence aspect of the data in which the system automatically changes the selection of the analyses models with changes in the environment.

The process concludes with a second processing step which entails processing the data of interest with the best CFAR analysis model to yield a set of CFAR processed data of interest in which false alarms are suppressed.

As described above, the present invention includes a CFAR processor that improves radar signal processor performance by increasing target probability of detection and reducing probability of false alarms in a severe radar clutter environment. This invention utilizes advances in artificial intelligence and expert systems technology for the development of data analysis and information (signal) processors used in conjunction with conventional (deterministic) data analysis algorithms to combine radar measurement data (including observed target tracks and radar clutter returns from terrain, sea, atmospheric effects, etc.) with topographic data, weather information, and similar information to formulate optimum filter coefficients and threshold tests. Present fielded radar systems use one CFAR algorithm for signal processing over the entire surveillance volume. However, radar experiments have shown that certain CFAR algorithms outperform others in different environments. The invention's system intelligently senses the clutter environment, selects and combines the most appropriate CFAR algorithm(s) to produce detection decisions that will outperform a processor using a single algorithm. The invention provides for improved performance through the application of rule-based and data-based expert system computer software technology to CFAR signal processors, thereby improving target detection by reducing processing losses which result from a mismatch between the single, fixed CFAR processor and the dynamically changing environment in which a radar must operate.

The requirements for high detection probability and low false alarm probability in modern wide area surveillance radars are rarely met due to spatial variations in clutter characteristics. Many filtering and CFAR detection algorithms have been developed to effectively deal with these variations; however, any single algorithm is likely to exhibit excessive false alarms and intolerably low detection probabilities in a dynamically changing environment. A great deal of research has led to advances in the state of the art in Artificial Intelligence (AI) and numerous areas have been identified for application to radar signal processing. The approach suggested here, discussed in a patent application submitted by the authors, is to intelligently select the filtering and CFAR detection algorithms being executed at any given time, based upon the observed characteristics of the interference environment. This approach requires sensing the environment, employing the most suitable algorithms, and applying an appropriate multiple algorithm fusion scheme or consensus algorithm to produce a global detection decision.

It is an object of the invention to minimize false alarms in data of interest.

It is another object of the invention to provide an artificial intelligence system which varies the selection of CFAR analysis models with changes in circumstances.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a CFAR system that applies artificial intelligence techniques in a system that dynamically selects CFAR algorithms and controls CFAR parameters based on the environment, and in doing so, should out-perform a single, fixed CFAR system.

Figure 1:
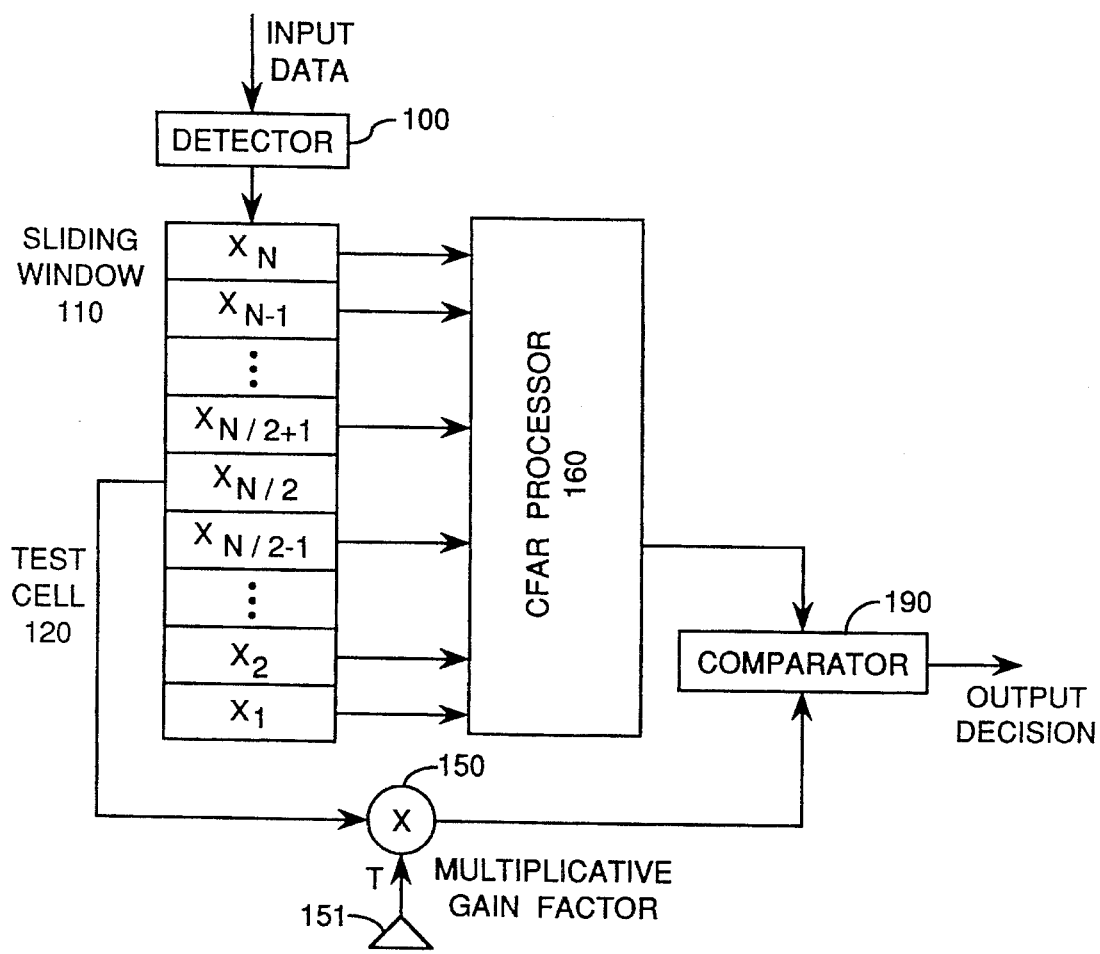
FIG. 1 is a block diagram of a system using a prior art cell averaging CFAR.

CFAR processors were developed to maintain a constant average false alarm rate through adaptive threshold control while maintaining adequate target detection performance. FIG. 1 illustrates a classical Cell Averaging CFAR (CA- CFAR) processor 160 operating on a sliding window 110 of n cells from the output of a linear detector 100. The cell 120 in the center of the window is referred to as the test cell and those on either side are guard cells. Secondary data obtained from the n cells leading and lagging the test and guard cells are averaged to yield an estimate of the interference in the test cell. This estimate is then compared via comparator 190 to the test cell after scaling by an appropriate multiplicative gain factor 150. A detection is declared if the product of the test cell and the multiplicate gain factor exceed the test cell background or interference estimate obtained from the secondary data. This process is repeated for subsequent radar returns in range, angle and Doppler. CA-CFAR was developed for operation in a homogeneous, Gaussian, thermal noise environment, and is optimum under these conditions. However, in wide area surveillance radar, these assumptions are routinely violated, with diverse returns whose statistical characteristics are varied and unpredictable and quite unlike those of thermal noise, even after filtering. The resulting effect is such that conventional CA-CFAR processing may generate excessive false alarms.

As an introduction to the Expert System CFAR (ES-CFAR) Processor, first consider the theory of target detection. As mentioned above, in FIG. 1 a sliding window of n cells from the output of a detector as 100 are applied to a CFAR processor 160. In the case of Greatest-Of CFAR (GO-CFAR), the leading and lagging windows are compared and the larger of the two is used as the interference estimate. In the case of Ordered Statistic CFAR (OS-CFAR) the cells in the reference window are placed in ascending order and the mth largest value of n cells is selected as the estimate of the interference. This estimate is then compared to the test cell after scaling by an appropriate multiplicative gain factor. A detection is declared if the product of the test cell and the multiplicative gain factor exceed the test cell background or interference estimate. This process is repeated for subsequent radar returns in range, angle and Doppler.

The classical approach to radar signal processing was developed for target detection by a ground-based radar looking high above near-range clutter. Interference is suppressed by the use of canceller-based filters such as Moving Target Indicator (MTI), assuming pulse to pulse invariance of the ground clutter. Additionally, Doppler processing is employed to further suppress clutter returns and improve Signal to Noise Ratio (SNR). Fast Fourier Transform (FFT) based filtering provides for excellent results. Typically, the output of the zero Doppler filter is ignored. The largest source of the interference is the return from near-in ground clutter, within the first few miles of the radar. At the long detection ranges of interest, ground clutter is almost non-existent and the only limitation to detection is thermal noise, generally accepted to behave as a complex Gaussian random vector. The output of the MTI canceller and/or Doppler filter is processed most appropriately using CA-CFAR.

Now consider modern long range airborne surveillance radars operating in a complicated interference environment. The steep grazing angles associated with down looking radar may produce clutter returns of far greater magnitude than in ground based systems. As such, clutter backscatter often mask returns from targets flying above these regions. Also, clutter statistics change dramatically as the platform moves. For example, within one scan, we may have to contend with clutter returns ranging from calm sea which we observe to behave as a Rayleigh distributed random vector, while at other locations within the surveillance volume we may encounter clutter returns from a land sea interface. Since terrain clutter backscatter often behaves as a K-distributed random vector, we ultimately must perform detection processing along a clutter edge where the statistics vary unpredictably. Clearly, the classical CA-CFAR detector used in ground based radar is not adequate. Further complicating this problem are spectrally spread sidelobe clutter returns which broaden the Doppler spectrum occupied by clutter, making Airborne Moving Target Indicator (AMTI) less effective. Also, FFT-based Doppler filtering is suboptimum because the clutter returns are no longer confined to the zero Hertz filter. Platform motion and sidelobe returns broaden the clutter spectrum, spreading clutter energy into adjacent Doppler bins. This further complicates detection processing. It is in situations such as this that the use of a single combination of filtering and CFAR algorithms will produce excessive false alarms, because it can not be designed to be optimum for each and every scenario to which it must be applied. In light of the many constraints imposed upon radar systems, improvements in detection performance are most likely to be a result of advanced processing techniques able to recognize the existence of these situations and apply appropriate processing while effectively maintaining a constant false alarm rate and an adequate detection probability.

Figure 2:
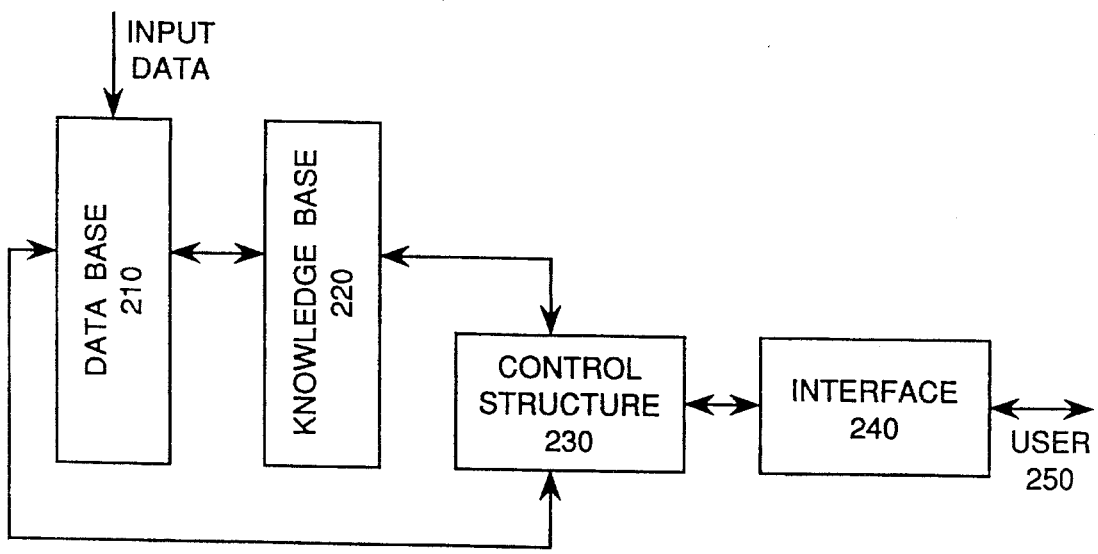
FIG. 2 is a simplified block diagram of an ES CFAR.

The ES-CFAR processor presented here is based upon the combined use of algorithmic and heuristic (artificial intelligence) techniques designed to assess the characteristics of the environment in order to apply the most appropriate filtering and CFAR detection algorithm. The concept and structure of an Expert System is illustrated in FIG. 2. Here, input data is compared to a data base where like or similar data sets are identified. These characteristics and descriptors of the data set are analyzed by a knowledge base which utilizes an extensive rulebase to make inferences about the data. These inferences are then interpreted to ascertain their meaning in the context of the decision problem, and applied to a control structure which makes adjustments to the system under control based upon the nature of the input data. Feedback may also be incorporated where outputs of the control structure are input to the data base providing additional sources of knowledge. The control structure relays decisions and actions to the user. The structure of the Expert System CFAR Processor as well as the many functions performed by it, are based on this design, and are to be discussed below.

FIG. 2 is a diagram representing one basic structure of an Expert System which uses a data base 210, a knowledge base 220, a control structure 230 and an interface 240 with the user 250. The control structure 230 is a data processor which will select the use of different CFAR detection algorithms based upon different conditions in the environment. In this case, the input data is compared to a data base where like or similar data sets are identified. Descriptors and characteristics of the input data are determined at this point. These characteristics and descriptors of the data sets are analyzed by a knowledge base which utilizes an extensive set of rules to make inferences about the data. These inferences are then interpreted to ascertain their meaning in the context of the problem and applied to a control structure which makes adjustments to the system "being controlled" based upon the input data. Feedback may be incorporated where outputs of the control structure are input to the data base providing additional sources of knowledge. The control structure relays decisions and actions to the user.

Figure 3:
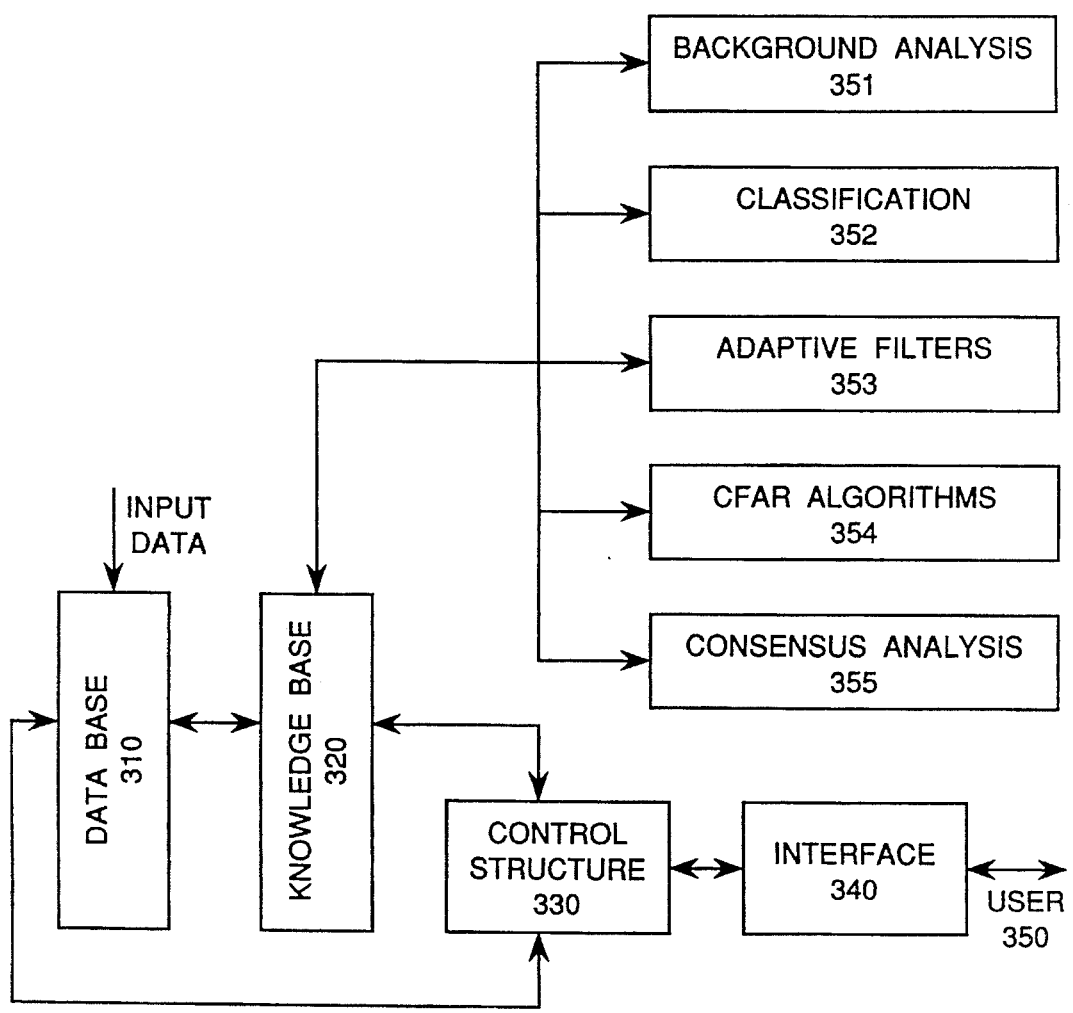
FIG. 3 is a detailed block diagram of an ES CFAR.

This Expert System technology can be applied to CFAR detection processing to develop an ES-CFAR Processor as illustrated in FIG. 3. The system operates in the same manner as described above, but the knowledge base has been modified to perform functions specific to target detection and false alarm control. For this particular problem, various knowledge sources are available to provide input to the knowledge base. There are basically five functions to be performed.

First consider the background analysis problem. As radar returns (data) are processed, one of the first tasks to be performed is determination of the statistical characteristics of the clutter. This entails identifying the probability density function (pdf) of the data as well as the associated parameters of the distribution. Standard histogram techniques, Quantile-Quantile and Percent-Percent (plot) analysis, moment techniques and various hybrid combinations are employed for this analysis.

Next, consider clutter classification (type). Also of importance in the selection of an appropriate CFAR detection algorithm are the physical attributes of the clutter (i.e. urban, sea, desert, etc). For example, extensive research has resulted in numerous clutter and interference models which associate physical clutter features with particular statistical distribution. In fact, many CFAR algorithms are designed for detection processing in clutter behaving according to these statistical distributions. This a priori knowledge provides the rule base which dictates the use of one CFAR algorithm over another in a given interference environment. Knowing the physical and statistical nature of the clutter environment, combined with performance measures for various CFAR algorithms as a function of clutter type, aids in the selection of the most appropriate CFAR algorithm. For example, it was stated previously that in a Gaussian white noise interference environment, CA-CFAR processing is optimum. If we consider performing detection along a clutter edge such as a transition from a thermal noise limited environment to sea clutter limited environment, the same CA-CFAR will exhibit excessive false alarms with a corresponding degradation in detection probability. A more prudent choice may be GO-CFAR which will abate the effects of the clutter edge on our ability to perform CFAR detection processing.

The adaptive filtering algorithm library is also important. As discussed above, various forms of clutter suppression and Doppler filtering schemes are available (MTI cancellers, Doppler filtering, space-time processing, etc.), but generally only one is used. Here, based on the assessment of the environment, we can not only choose the most appropriate CFAR algorithm, but also the most appropriate filtering technique to precede the CFAR detector.

Figure 4:
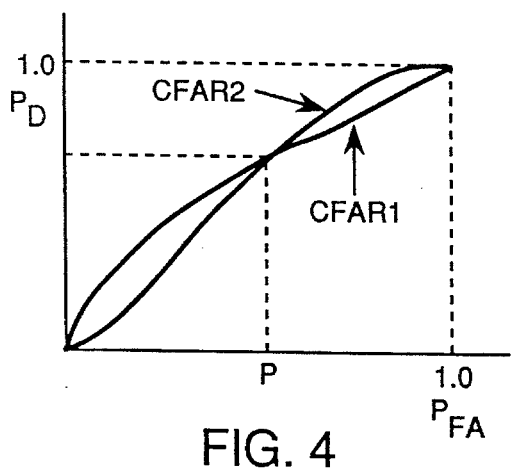
FIG. 4 is a chart comparing receiver operating characteristics for two CFAR algorithms.
Figure 5:
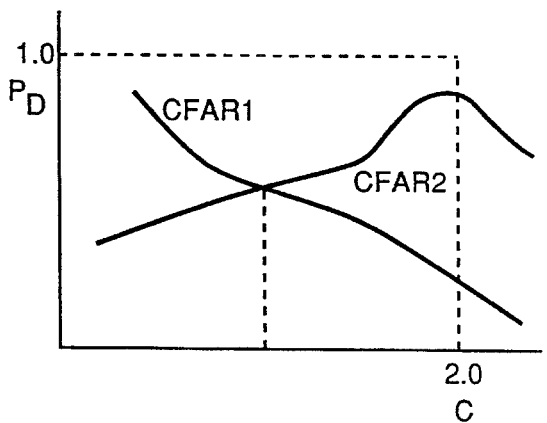
FIG. 5 is a chart illustrating the variation in detection performance versus Weibull shape parameter for two arbitrary CFAR algorithms.

A complete library of CFAR algorithms is critical. Many of the rules in the knowledge base control the utilization of CFAR algorithms. For each algorithm in the library, performance under the dynamic conditions of interest to the radar system engineer must be available. The relative performance of each CFAR algorithm must be quantified as a function of clutter type/statistic, detection probability, false alarm probability and CFAR processing loss. CFAR algorithm performance will vary widely considering the variety of backgrounds likely to be encountered in an airborne radar system. It is for this reason that the library must contain CFAR algorithms with variable parameters such as Cell Averaging, Greatest-Of, Ordered Statistic, and Trimmed Mean. Each of these algorithms exhibit performance advantages that can be exploited in an attempt to maintain an adequate level of detection and false alarm probability. One conventional performance measure of a detector is the receiver operating characteristics (ROC) which is a plot of detection probability versus false alarm probability. Intuitively, one would expect that as detection probability is increased, the threshold must be lowered, and consequently, false alarm probability will be increased. FIG. 4 is a sample plot of the ROC for two different CFAR algorithms. This illustrates the very different behavior of two CFAR algorithms under the same conditions. We may also observe detection performance as a function of pdf, or more specifically, the variation of the parameters of a given pdf. FIG. 5 is a plot of detection probability versus Weibull shape parameter for two (arbitrary) CFAR algorithms. Again, we can see the very different behavior of these algorithms under identical background conditions. These are examples of the factors affecting detection and false alarm probability and the extent to which they dictate the use of one CFAR algorithm over another.

Finally, consensus analysis must be considered. After selection of the most appropriate algorithms, detection processing is performed and decisions from the selected CFAR algorithms must be weighted and fused to produce a satisfactory global detection decision.

The knowledge sources are not limited to the five listed above, but may also include exogeneous variables such as temperature, wind speed, and precipitation. These factors are not directly related to target detection, but can certainly play a role in altering the statistics of the background interference we are trying to suppress.

Figure 6:
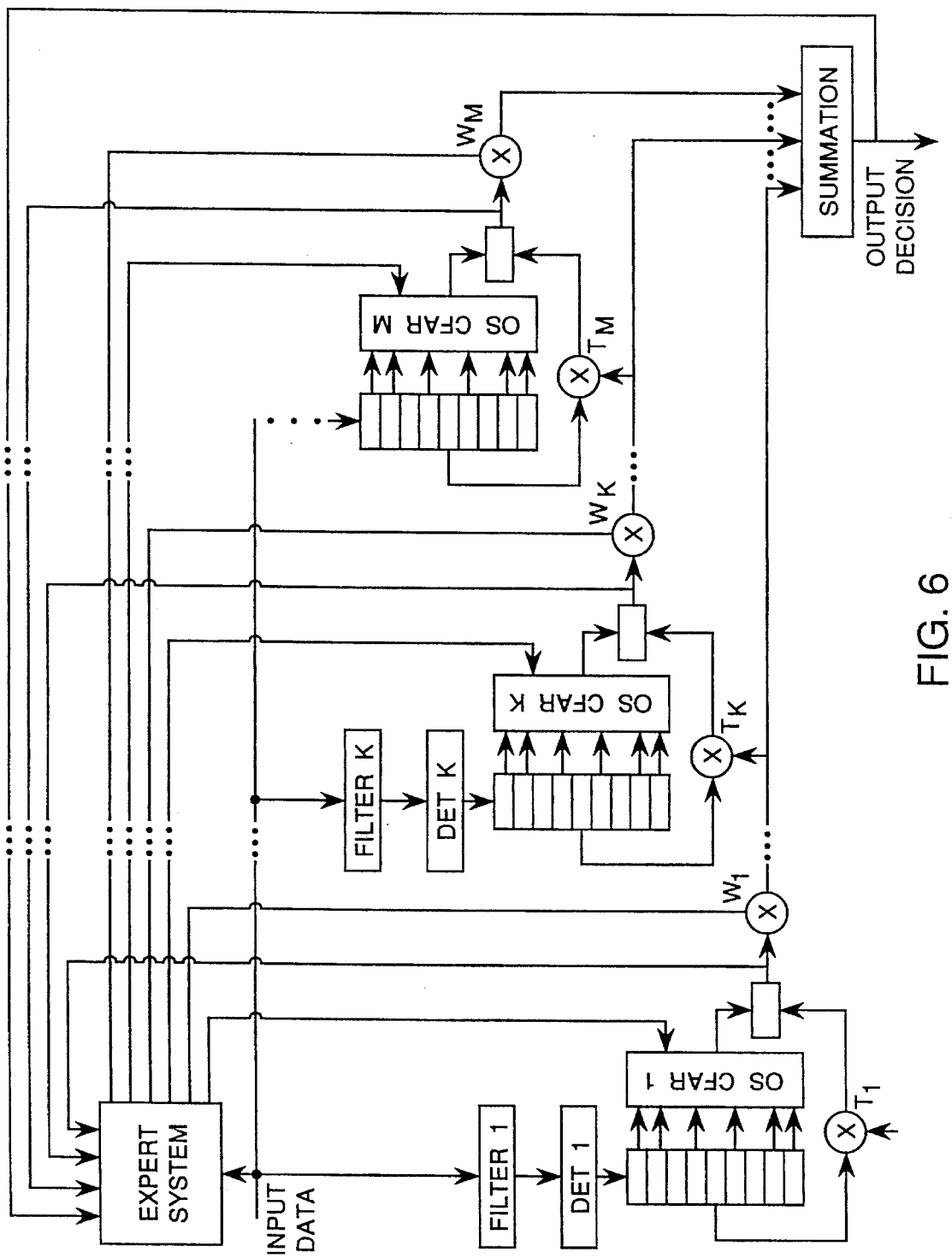
FIG. 6 is a detailed block diagram of the elements of the preferred embodiment of the ES-CFAR processor.
Figure 7:
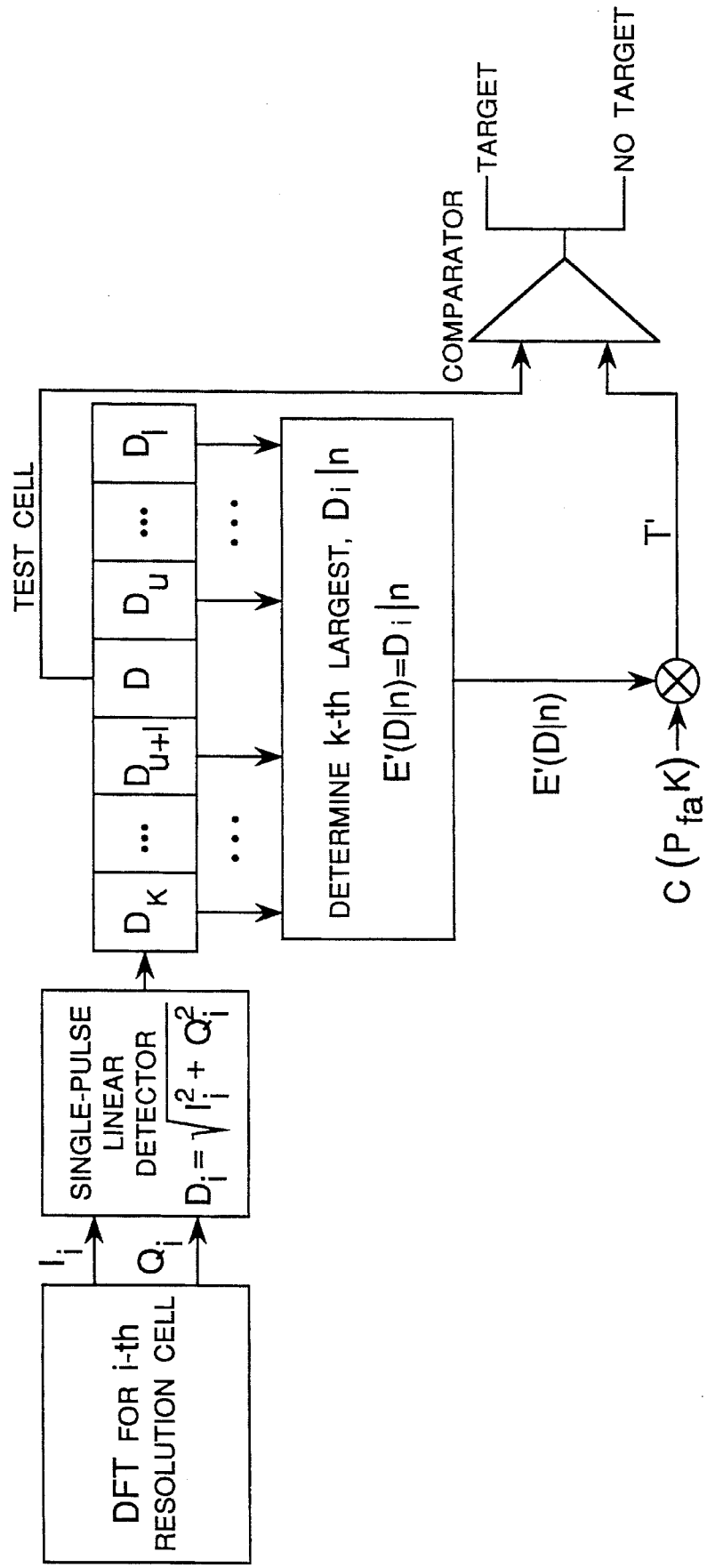
FIG. 7 is a block diagram of an OS CFAR processor used for single-pulse linear detection.

A conceptual diagram of the ES-CFAR System is illustrated in FIG. 6. The input is applied to an expert system where analysis (heuristic and algorithmic) produces the statistical and physical characteristics of the data. This information is used in conjunction with a library of CFAR algorithms, containing algorithms such as Cell Averaging, Greatest Of, Smallest Of, Ordered Statistic and Trimmed Mean. Within each of these individual CFAR algorithms there are many subclasses with various combinations of rank, order, window size and multiplicative gain factor. Preceding each of the CFAR algorithms is a filter and detector matched to that particular CFAR algorithm. In this way one ensures that the filtering of radar data corresponds to the method of CFAR detection processing that follows. Based on the characteristics of the input data, the expert system assigns weights to the outputs of the various CFAR algorithms corresponding to their suitability given the input data. The weighted outputs are then summed to produce a cumulative or global detection output. This output could be, in simplest form, the decision of just one of the CFAR algorithms. Alternatively, the output could be more complex such as summation of the weighted outputs of CFAR algorithms. In this way the most appropriate combination of CFAR algorithms and parameters are used to perform CFAR detection processing.

The conflicting requirements for high probability of detection and low probability of false alarm are rarely met in a wide area surveillance radar, due to spatial variations in the clutter. Any single algorithm is likely to be inadequate in a dynamically changing environment. The approach suggested in this paper is to select the filtering and CFAR algorithms being executed at any one time based upon the observed characteristics of the interference. This requires sensing the environment, employing the most suitable filtering and CFAR algorithms, and applying a consensus algorithm to produce a global detection decision. Based on advances in expert systems, adaptive processing and CFAR algorithms, this approach has the potential to provide significant performance improvements to future wide area surveillance radars. Commercially operating systems can also benefit from this technology; FAA air surveillance radars must contend with a very dense target environment where false alarms, missed detections and operator overload are factors which must be tightly controlled to avoid disastrous outcomes in the civilian/commercial travel industry.

The prototype ES-CFAR Processor has been developed on a Sun Sparc Station 4/470 using a commercial-off-the-shelf software development package called G2 by Gensym Corporation. It is a real-time expert system development shell used for Knowledge Base and Inference Engine development. G2 is currently being used in numerous real-time systems including a prototype hydroelectric power generation plant monitoring and control system and is incorporated into software analysis tools on board the National Aeronautic and Space Administration (NASA) Space Shuttle. The ES-CFAR Processor does not currently operate in real time because G2 is performing many extraneous functions which would not be required when utilized in a fielded radar system, such as simulated data generation, performance monitoring, and graphical display. Additionally, the prototype has been developed to provide a great deal of flexibility to emulate a variety of CFAR detection processors as a baseline for performance comparison. Essentially, two CFAR processors (baseline and ES-CFAR) are running simultaneously which would not be required for fielded operation. When a specific candidate radar system is chosen for implementation, a point design configuration can be developed using high speed floating point processor boards.

The prototype ES-CFAR Processor was developed through off-line analysis of radar processing functions, allowing an expert to assess the characteristics of the environment and to apply the most appropriate CFAR algorithm. It is important to be able to accurately identify the statistical characteristics of the background interference. Standard techniques are currently employed for this purpose, although research into a new statistical distribution identification techniques is continuing. Also essential is a library of CFAR algorithms chosen so that the most stable algorithm for detection processing may be chosen for any interference scenario likely to be encountered. An extensive literature search was performed which revealed an abundance of journal articles reporting the existence of more than 40 CFAR algorithms developed to counter the effects of non-homogeneous clutter, interfering targets, clutter edges and Electronic Counter Measures (ECM). The conclusions reached provided insight and directions into those CFAR algorithms that should be implemented in the prototype ES-CFAR Processor. Additionally, these same results helped to formulate the rules incorporated into the expert system which dictated the selection of one CFAR algorithm over another.

The knowledge sources are not limited to the five listed above, but may also include exogeneous variables such as temperature, wind speed, and precipitation. These factors are not directly related to CFAR detection, but can certainly play a role in altering the statistics of the background we are trying to suppress.

There are many ways an ES-CFAR Processor could be envisioned, but the preferred embodiment is illustrated in FIG. 6. The input data is applied to the expert system where data analysis (heuristic and algorithmic) produces the statistical and physical characteristics of the data. The library of CFAR algorithms consists of a variety of Ordered Statistic CFAR (OS-CFAR) algorithms with varying values of rank and order. There are a total of M such algorithms in the Expert System CFAR Processor. Preceding each of these M OS-CFAR algorithms is a filter and detector illustrated for completeness. Each OS-CFAR in FIG. 6 is of this form. Based on the characteristics of the input data, the expert system assigns weights to the outputs of the M CFAR algorithms corresponding to their suitability to the input data. The M weighted outputs are then summed to produce a cumulative or global detection output. This output could be, in simplest form, the output of just one of the M CFAR algorithms. Alternatively, the output could be more complex such as a summation of the weighted outputs of all M CFAR algorithms. In this way the most appropriate combination of rank and order are used to perform CFAR detection processing.

As an example of a possible implementation of the preferred embodiment of the ES-CFAR Processor, let us consider target detection in the presence of a clutter edge. Here, some of the reference cells are occupied by clutter while the rest are occupied by noise only. The single, fixed CFAR algorithm will raise the threshold to an intolerable level by overestimating the power level of the background. This same high threshold will also decrease the detection probability. In a case such as this it is desirable to vary the parameters of the CFAR algorithm, namely, the window size, order and threshold multiplier for an Ordered Statistic CFAR algorithm. Assuming some knowledge about the background derived from the Clutter Classifier such as number of clutter cells in the reference window, we can select the most appropriate parameters for performing detection processing. Table I lists an illustrative example of the order values that would be selected for an OS-CFAR algorithm with a window size of 32, a target signal-to-noise ratio of 10 dB. and designed for a false alarm probability of 0.001 for varying clutter power levels and number of reference cells occupied by clutter. As is evident from the table, where OS(n) is the nth largest data point out of k samples, the knowledge and classification of the clutter plays an important role in intelligently varying the parameters of the CFAR algorithm to meet the design false alarm and detection probabilities.

The Expert System CFAR Processor, ES-CFAR, has the advantages of improved detection performance and false alarm control in the presence of non-Gaussian, non-stationary interference relative to a conventional CFAR processor utilizing a single, fixed CFAR algorithm. By intelligent sensing and classification of environmental interference, the most appropriate CFAR algorithm or combinations of CFAR algorithms may be chosen to maximize detection probability while maintaining a satisfactorily low probability of false alarm.

Figure 8:
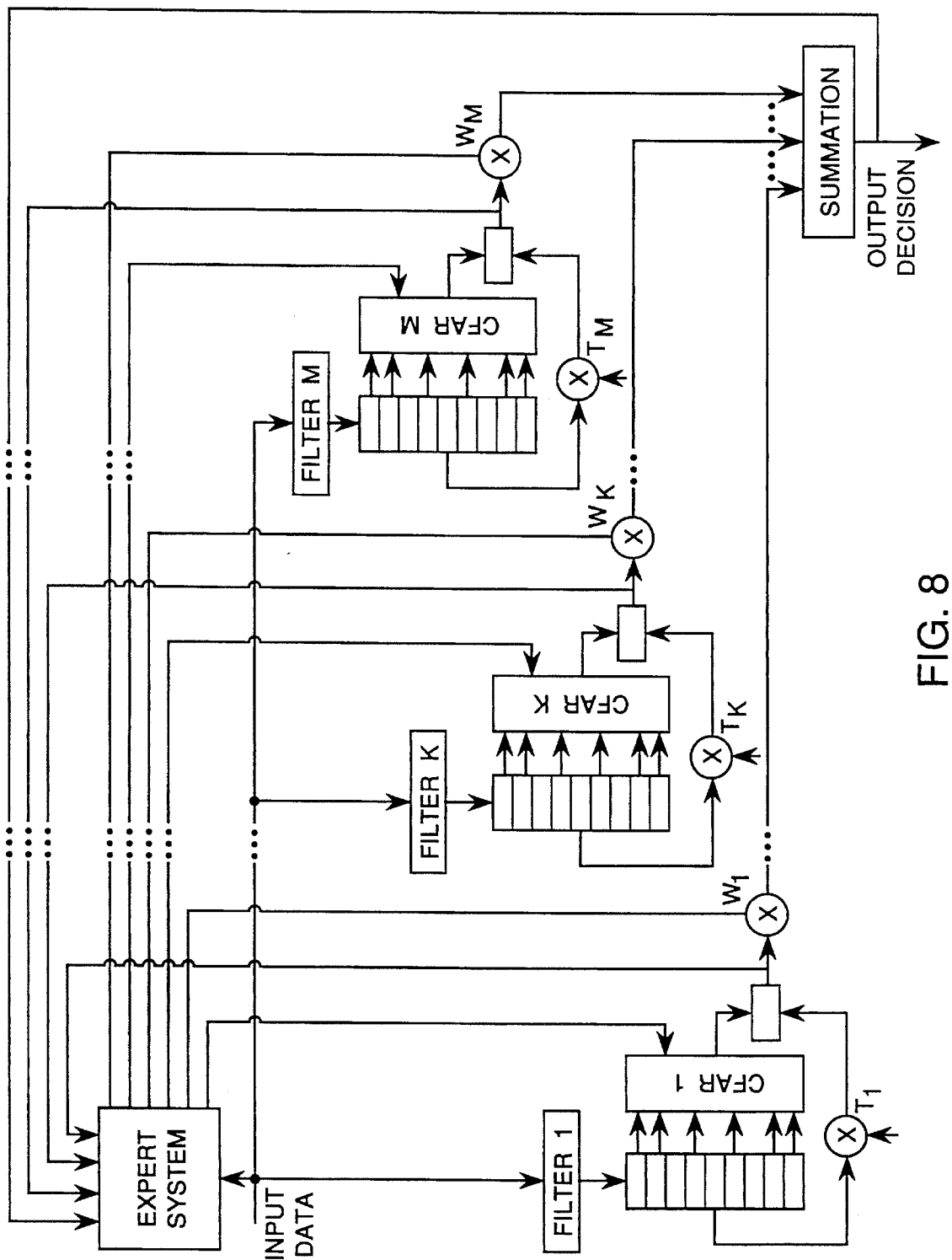
FIG. 8 is a block diagram of another embodiment of an ES CFAR processor.

The Expert System CFAR (ES-CFAR) Processor can be implemented in many other ways other than the preferred embodiment described previously. Instead of choosing from a CFAR algorithm library of M different Ordered Statistic CFAR algorithms, the library could consist of multiple CFAR algorithms such as Cell Averaging (CA-CFAR), Greatest-Of (GO-CFAR) and the OS-CFAR mentioned above. Within each of these individual CFAR algorithms there may be subclasses with various combinations of rank and order as described previously, or window size and multiplicative gain factor for CA-CFAR and GO-CFAR. FIG. 8 illustrates how this could be implemented. By adding another control line from the expert system to each of the individual CFAR algorithms, the parameters of the CFAR algorithm could be specified in addition to just selecting the CFAR. In this way additional adaptivity can be added to the system to deal with more complex interference scenarios that one may encounter in the dynamically changing environment encountered by a long range, wide area surveillance radar system.

Figure 9:
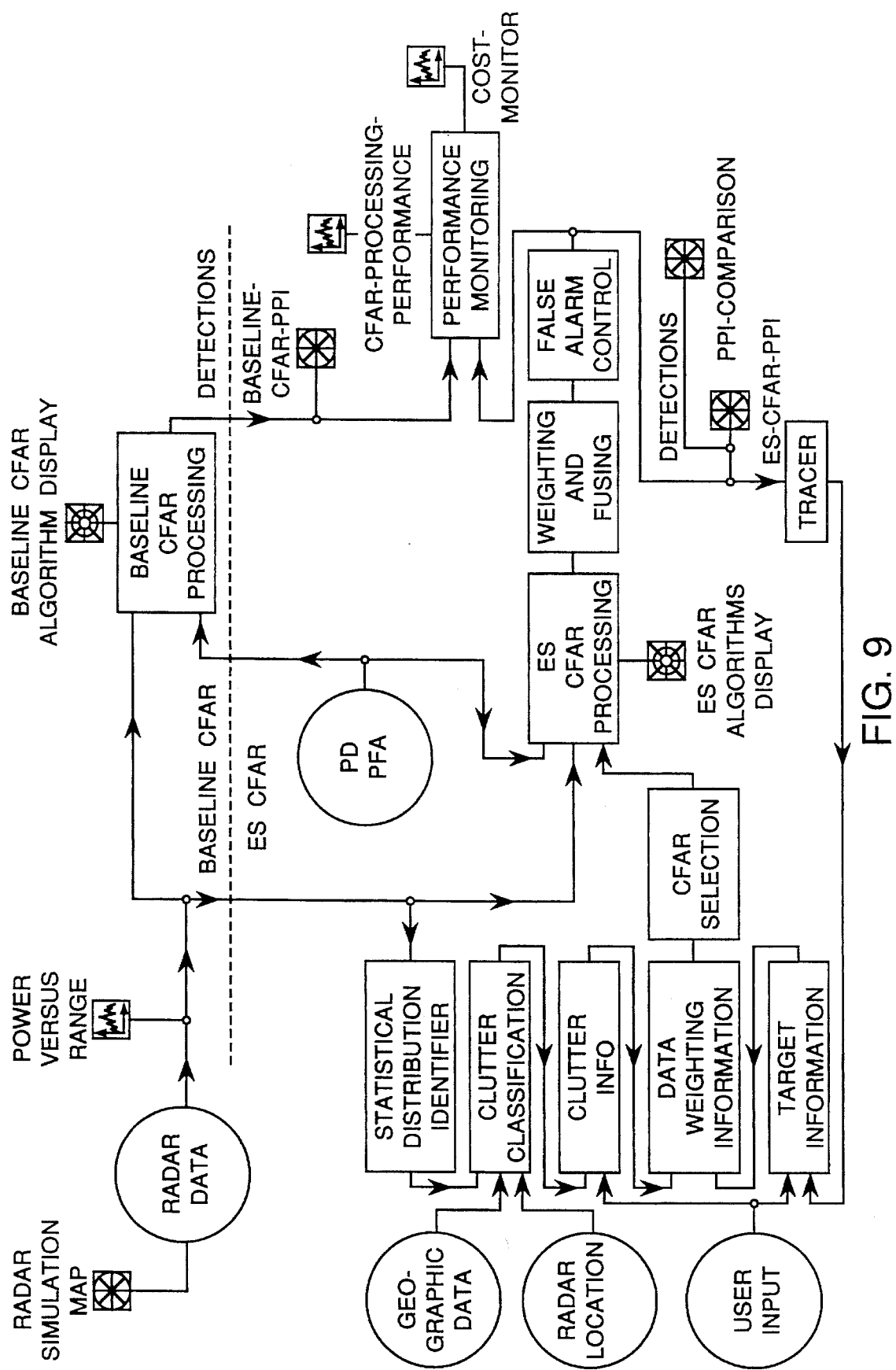
FIG. 9 shows a radar system with its data processed by an ES CFAR processor.

A schematic diagram of the ES-CFAR Processor is illustrated in FIG. 9. Not all functions are fully implemented at this time. The upper portion of the figure (above the dashed line) depicts the baseline system, representing a typical radar operating with one CFAR algorithm in the signal processor. The remaining portion of the figure (below the dashed line) illustrates the major functional aspects of the conceptual ES-CFAR system. Radar returns, which may be raw data, FFT-Doppler filtered data, or adaptively filtered data, are processed by both systems. Following this filtering operation, the target signal is competing favorably with the background interference. The Baseline Processor performs detection processing on this data using a single, fixed CFAR algorithm. This algorithm may be chosen from any of the CFAR algorithms in the library, but once selected will be used for all detection processing. As the library of CFAR algorithms is expanded, one can emulate the performance of the CFAR detector in any fielded system. The library of CFAR algorithms currently contains Cell Averaging, Greatest Of, Ordered Statistic and Trimmed Mean processors. Below the dashed line, ES-CFAR processing occurs simultaneously with the baseline, using the same input data. At the right side of the figure, the circles indicate Knowledge Sources such as Geographic Data, Radar Location, and User Inputs. In future implementations, map information will be used in conjunction with the radar location and the antenna pointing direction to assess the physical features of the surveillance region (i.e. sea, desert, urban, etc.) The radar returns are processed to extract information concerning the statistics of the clutter. The statistical and feature information form the basis for selection of the most appropriate CFAR algorithm(s) to be used by the ES-CFAR Processor for detection processing. The outputs of the CFAR algorithm(s) are weighted and fused to produce a global detection decision which is further processed for track initiation. The output of the tracker is fed back as additional knowledge. For example, the tracker may indicate the presence of multiple closely spaced targets. The results of the Baseline and ES-CFAR Processors are then presented respectively on two simulated PPI displays depicting the resultants targets and false alarms. Alternatively, the resultant detection and false alarm probabilities are plotted as a function of time for both the Baseline and ES-CFAR Processors as another indication of performance.

The input data may be either simulated or measured. The simulated data is generated by the expert system according to a surveillance scenario specified by the user. Clutter with various distributions and parameters may be "drawn" on the PPI display. Targets may also be placed within the surveillance area and assigned various cross sections. This provides a controlled means to evaluate the performance of the baseline against that of the ES-CFAR Processor. Results are displayed as discussed in the last paragraph. A capability also exists to import data from outside the expert system and process it in the same fashion. This data may be one-dimensional (such as range only) or multi-dimensional (such as range and Doppler). Again the user selects the CFAR algorithm to be used in the baseline and performance is compared to that of the ES-CFAR system which adaptively performs CFAR processing based upon the background.

Extensive testing has been performed on the ES-CFAR Processor in an attempt to compare its performance to a baseline CA-CFAR Processor. This testing has taken the form of both simulated and measured data. In the following paragraphs this testing will be described in more detail showing the dramatic performance improvements to be derived by use of the ES-CFAR processor. This will be followed by a discussion of the potential applicability of ES-CFAR to the AN/APS-145 radar aboard the E-2C Hawkeye as well as potential performance in the presence of ECM.

Figure 11:
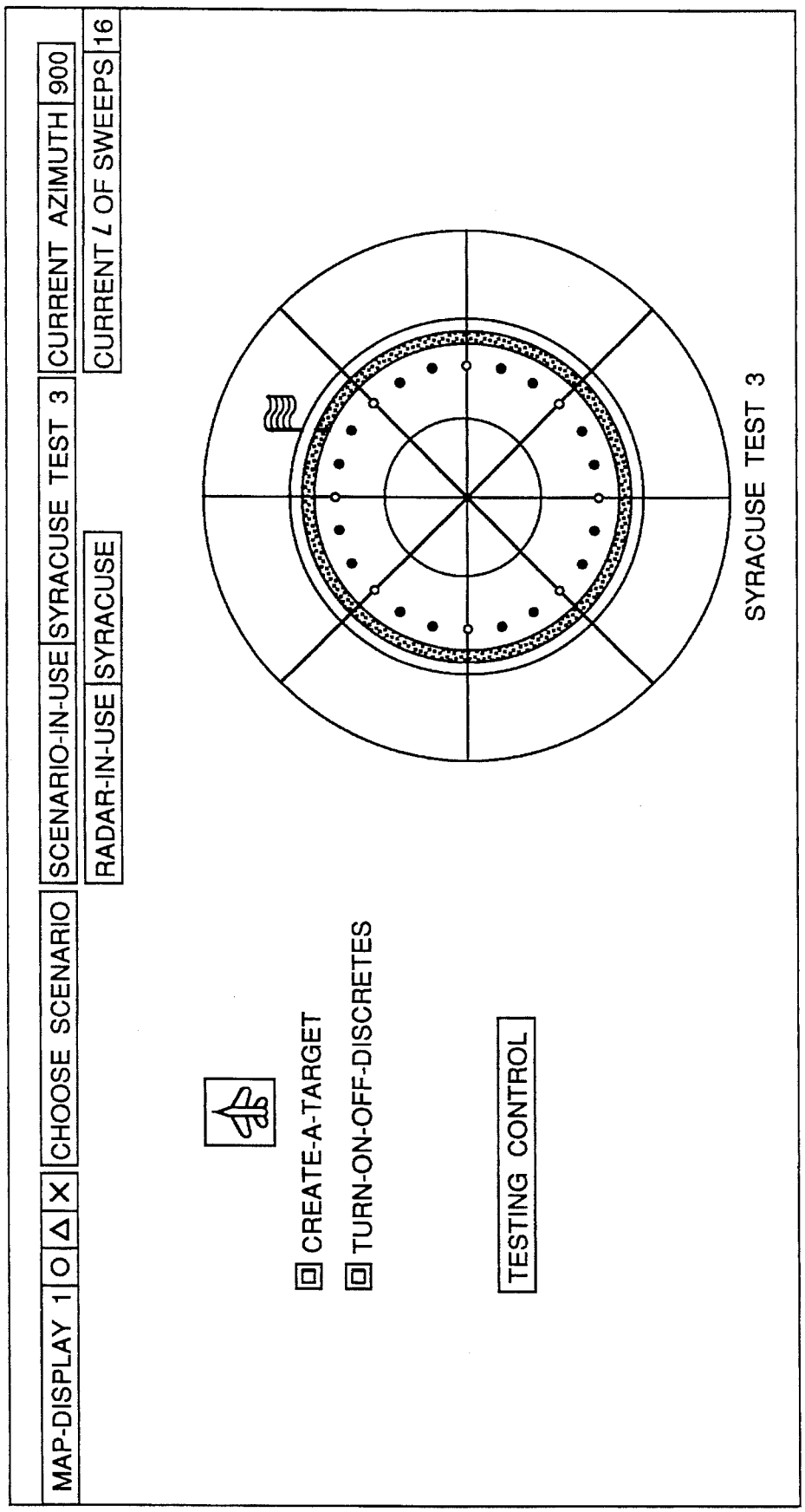
FIG. 11 is a chart illustrating one of the scenarios for simulation analysis, a ring of exponentially distributed clutter is placed around the radar location (marked with the flag)
Figure 12:
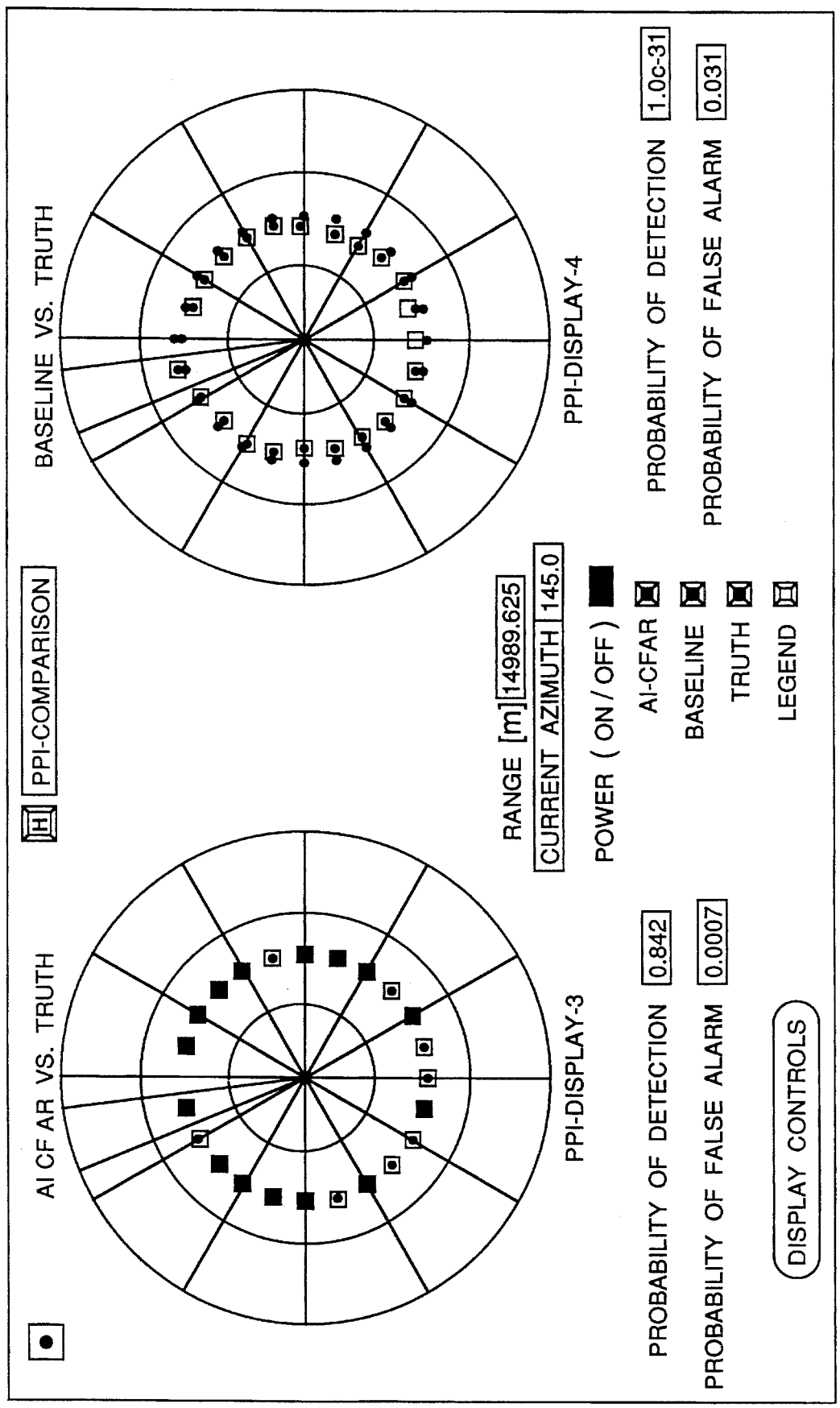
FIG. 12 is a chart illustrating the detection performance of the expert system CFAR (left hand display) versus cell averaging CFAR (right hand display).

A total of nine simulated scenarios were developed for analysis by the ES-CFAR Processor. These scenarios were chosen to represent some of the most stressing environments encountered, and included non-Gaussian clutter, interfering targets and clutter edges. One of the scenarios will be described in detail, and the results of the remaining eight will be shown in tabular form. In one of the scenarios for simulation analysis, a ring of Exponentially distributed clutter has been placed around the radar location. See FIG. 11. FIG. 11 is a chart illustrating one of the scenarios for simulation analysis, a ring of exponentially distributed clutter is placed around the radar location (marked with the flag). All other range cells contain white noise. This scenario incorporates a target near a boundary between two regions of interference within the typical CFAR reference window. Conventional CA-CFAR will tend to elevate the threshold level in this case because Exponential clutter returns in the leading window are much stronger than the Gaussian noise in the lagging window thus causing the target to be undetected. Statistically identical interference is generated at each beam position so that after several scans a sufficiently large number of data points have been processed to make the selected false alarm probability of 0.001 statistically meaningful. Many detections were reported at each beam position and all occurred in the vicinity of the clutter edge, as it was the edge of the clutter region which was detected and not the target. No detections occurred at the actual range of the target (i.e. in the square). See FIG. 12. FIG. 12 is a chart illustrating the detection performance of the expert system CFAR (left hand display) versus cell averaging CFAR (right hand display). This is typically the case when using CA-CFAR to perform detection processing along a clutter edge. False alarms are generated and weak targets near the clutter edge are not detected. The ES-CFAR Processor was able to recognize this discontinuity (clutter edge) as the CFAR window moved in range. The rules in the expert system appropriately dictated a change of CFAR processing for better detection performance. The PPI on the left corresponds to the ES-CFAR Processor. It displays a large number of detections all occurring within the squares, indicating correct detections.

As mentioned previously, eight other simulated scenarios were run which posed stressing problems such as clutter edges, interfering targets and non-homogeneous clutter. The results of all nine scenarios are listed in Table I for the Baseline and ES-CFAR Processors. As can be seen, the ES-CFAR Processor significantly outperformed the Baseline in terms of detection while also maintaining a better false alarm probability.

TABLE I

SIMULATED DATA RESULTS

Desired $P_f = 10^{-3}$

| Scenario | ES-CFAR | | Baseline | |
|---|---|---|---|---|
| | $P_d$ | $P_f$ | $P_d$ | $P_f$ |
| 1 | 0.77 | $7.0 \times 10^{-3}$ | 0.01 | $2.6 \times 10^{-2}$ |
| 2 | 0.24 | $2.0 \times 10^{-2}$ | 0.21 | $3.4 \times 10^{-2}$ |
| 3 | 0.82 | $7.2 \times 10^{-4}$ | 0 | $3.1 \times 10^{-2}$ |
| 4 | 0.73 | $2.0 \times 10^{-3}$ | 0.94 | $9.2 \times 10^{-3}$ |
| 5 | 0.05 | $2.0 \times 10^{-3}$ | 0.42 | $2.1 \times 10^{-2}$ |
| 6 | 0.71 | $2.2 \times 10^{-3}$ | 0 | $3.8 \times 10^{-2}$ |
| 7 | 0.64 | $3.7 \times 10^{-3}$ | 0.66 | $7.2 \times 10^{-3}$ |

TABLE I-continued

SIMULATED DATA RESULTS

Desired Pf = $10^{-3}$

| Scenario | ES-CFAR | | Baseline | |
|---|---|---|---|---|
| | $P_d$ | $P_r$ | $P_d$ | $P_r$ |
| 8 | 0.88 | — | 0.40 | — |
| 9 | 0.84 | — | 0.10 | — |

TABLE II

MEASURED DATA RESULTS

| ES-CFAR | | | Baseline CFAR | |
|---|---|---|---|---|
| $P_d$ | $P_r$ | Desired $P_r$ | $P_d$ | $P_r$ |
| 0.92 | $1.0 \times 10^{-3}$ | $1 \times 10^{-3}$ | 0.62 | $1.9 \times 10^{-3}$ |
| 0.90 | $2.9 \times 10^{-4}$ | $1 \times 10^{-4}$ | 0.51 | $5.1 \times 10^{-4}$ |
| 0.87 | $1.0 \times 10^{-4}$ | $1 \times 10^{-5}$ | 0.44 | $2.7 \times 10^{-4}$ |
| 0.87 | $3.3 \times 10^{-5}$ | $1 \times 10^{-6}$ | 0.28 | $1.2 \times 10^{-4}$ |

Using FIG. 2.2.2 on page 62 from Barton's modern Radar System Analysis test and the results from Table II on page 34 of this patent application, the improved detection performance and reduced false alarm rate provides for an improvement of 6.4 dB over CA-CFAR and 5.7 dB over OS-CFAR. This is equivalent to a 50% increase in range in a clutter limited environment.

AIRBORNE MEASURED DATA ANALYSIS AND RESULTS

To verify ES-CFAR performance, a comparison was made at Rome Laboratory using a database of recorded radr returns from an airborne radar system. This data set was collected for another purpose, but it did allow for testing the ES-CFAR Processor in a multiple (interfering) target scenario and in the presence of a clutter edge.

The airborne radar is a medium PRF pulsed Doppler system and data was recorded as the antenna swept past the targets of interest. The system PRF is constantly changing during each Coherent Processing Interval (CPI) so that the range ambiguity of this medium PRF waveform can be resolved. The result of each CPI is a two dimensional map of range versus Doppler. Many such range versus doppler data sets were collected and served as the input to the ES-CFAR Processor. Detection processing in modern airborne radars is via Cell Averaging CFAR. This was the Baseline CFAR algorithm used for performance comparison. The ES-CFAR Processor accepts this data and also processes it using all the CFAR algorithms available in the CFAR Algorithm Library as discussed above. A total of 25 CPIs have been processed in this way for various design values of false alarm probability (0.001, 0.0001, 0.00001 and 0.000001). Table II is a listing of the detection and false alarm results for the case of the design false alarm probability of 0.000001 for all 25 processed CPIs. Table 2 is a summary of the performance for the four cases corresponding to the four design false alarm probabilities in terms of the resultant values of detection and false alarm probabilities of the Baseline and the Expert System CFAR Processor. It is evident that ES-CFAR improves both detection and false alarm probability and would have significant impact on modern long range surveillance radars.

Obtaining similar improvements by increasing the antenna aperture or transmit power would be prohibitive. In addition, if detection is limited by sidelobe clutter and not thermal noise, a larger power-aperture product alone would likely not improve detection performance.

The U.S. Navy is currently implementing the Group 2 update of the E-2C early warning surveillance platform. Target detection and tracking performance is greatly improved by an upgrade to the General Electric AN/APS-145 radar. Significant improvements have been made to the Detection and Data Processor which provides for automatic radar configuration and performance optimization over heterogeneous ground clutter environments. Based on the E-3 performance analyses accomplished to date, the ES-CFAR processor could provide significant improvement in target detection, tracking and false alarm control over this single CFAR scheme processor, even with its improved adaptive thresholding control. In the near future, we would like to perform an analysis similar to that reported on here to provide an assessment of the ES-CFAR processor performance using actual E-2C data.

Figure 10:
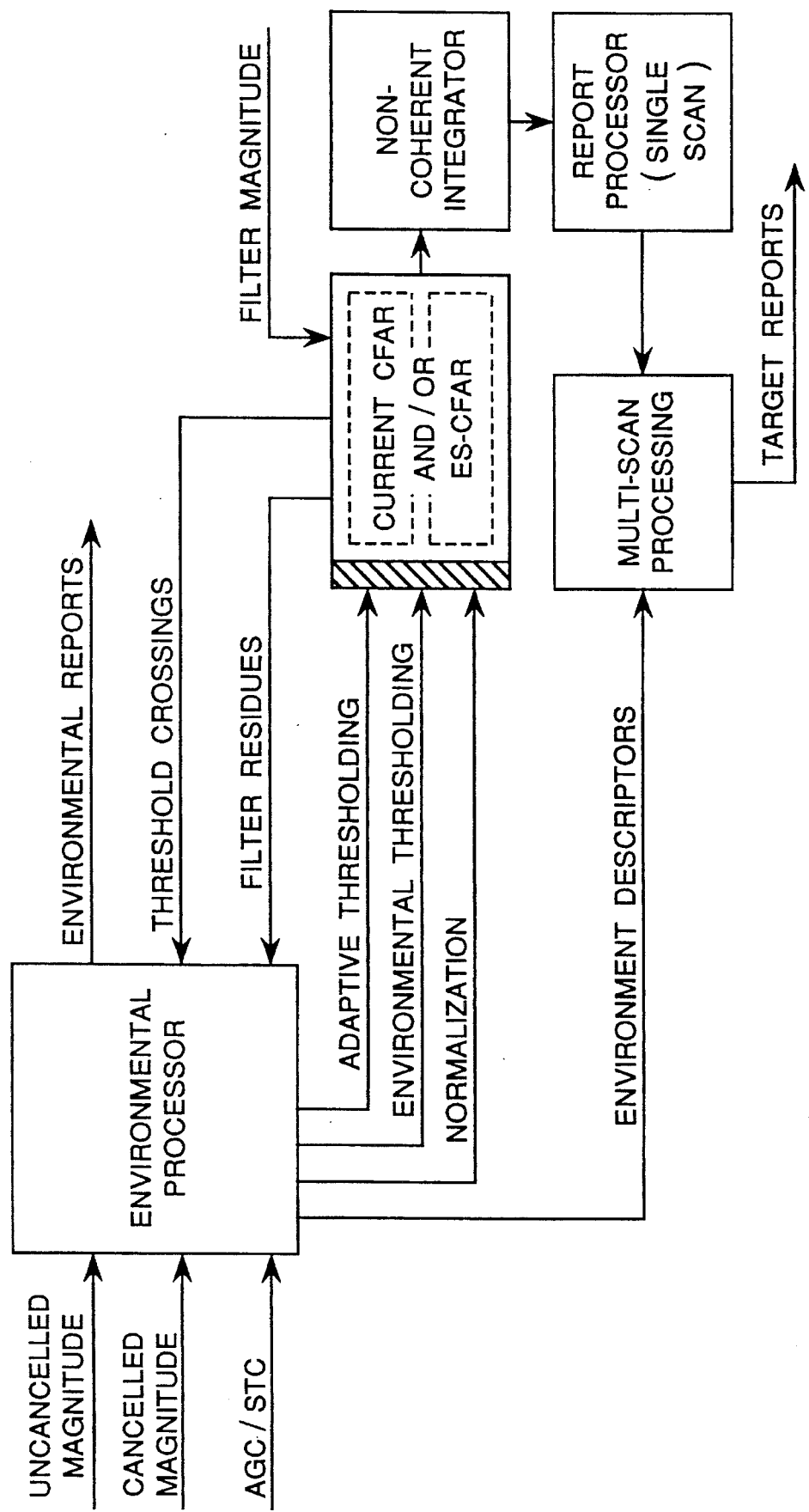
FIG. 10 is a diagram of an ES-CFAR system using artificial intelligence to perform environmental processing as it selects an appropriate CFAR algorithm.

FIG. 10 presents a functional block diagram illustrating data flow and processing surrounding the new Environmental Processor (EP) function within the Detection and Data Processor. It is the introduction of this processor into the AN/APS-145 which is key to enabling low-risk implementation of the ES-CFAR. We clearly show in FIG. 10 where the ES-CFAR integrates into the current processing architecture, and that it takes advantage of the existing data streams. The EP constructs a map of the surveillance volume segmented into cells 4 miles in range by 5.6 degrees in azimuth. Each cell goes through a two-level classification. The course classification determines whether it is land, sea or clear and this categorization is used to invoke subsequent processing modes (e.g. MTI, surface surveillance, bypass). A finer classification estimates potential detection densities, providing input for detection threshold control and multi-scan processing which produces target reports. The ES-CFAR performance would be enhanced by taking advantage of this volume segmentation and environmental characterization, improving performance over the difficult littoral zones even above that already demonstrated in this paper for the E-3. Introduction of the ES-CFAR as a P3I to the E-2C has the potential to provide dramatic target detection, tracking and false alarm control improvements with manageable (limited scope, low-cost and at low risk) impact on the existing system.

Modern Electronic Warfare (EW) techniques heavily rely upon the ability to deny information to an enemy radar or to deceive the enemy radar by generating false target returns in range, angle or Doppler. The development of modern sensors for Command, Control, Communications and Intelligence (C3I) incorporating advanced Electronic Counter-Counter Measures (ECCM) for robust survivable performance in an EW environment is governed by Department of Defense policy through DoD instruction 5000.2. Robust ECCM techniques are not tailor-designed to address the weaknesses of a particular ECM, but are intended to be effective against a large variety of ECM techniques. While maintaining this effectiveness in the presence of ECM, it is important that the ECCM technique not introduce large performance losses when operating in a non-ECM environment. Additionally, robust ECCM techniques should be non perishable, remaining undetectable by the enemy, or, at least, not susceptible to additional countermeasures. Modern ECM techniques are designed to degrade the performance of various radar receiver and signal processor functions. For example, detection performance may be degraded in several ways as discussed below. In many cases these ECM techniques are used to simply preclude detection by an enemy radar and in other cases they are used evasively to break an established track so that weapons cannot be fired accurately. ECM techniques generally take the form of either noise-like (denial) jammers or false target (deception) jammers. These offensive roles are routinely assigned to escort, self-screening and standoff jammers.

The noise-like jammers may be barrage noise, narrow band Doppler noise or responsive spot noise to name a few. These are usually used to defeat the commonly used CA-CFAR detector by generating a statistical discontinuity near the actual location of the target in range, angle or Doppler. This discontinuity causes the CA-CFAR algorithm to overestimate the required threshold for detection and thus the true target goes undetected. This situation is very similar to clutter edge processing where conventional CA-CFAR performs poorly. The ES-CFAR Processor has been shown to significantly outperform a conventional Baseline CA-CFAR processor in these situations by recognizing this discontinuity and processing the data accordingly. As such, it is logical to conclude that similar benefits could be derived for purposes of Electronic Counter-Counter Measures in a modern radar system via ES-CFAR processing.

Similarly, false target jammers may fall into such categories as false range or Doppler targets, range or velocity gate pull-off or cover pulse. These techniques are commonly used to generate a false target in range or Doppler near the true target location and at a significantly higher Signal-to-Noise ratio (SNR) than the true target. The conventional CA-CFAR will perform poorly in this situation because the larger false target serves to mask the true target signal by elevating the detection threshold so that the smaller true target signal goes undetected. Once this deception has occurred successfully, the false target signal may be moved in range or Doppler so that the range or velocity gate generated by the victim radar is moved from the true location of the target. It is in this way that ECM techniques are used to break a radar track. An ECM situation such as this is very similar to detection processing in the presence of multiple interfering targets. The ES-CFAR Processor has demonstrated dramatic performance improvements in multiple interfering target scenarios. Because of the similarity of multiple interfering target scenarios to false target jammers, ES-CFAR may provide modern radar systems with added resilience to this type of ECM.

The ES-CFAR Processor has not been evaluated using ECM contaminated data, but the argument given in the previous paragraphs suggests that ECCM improvements are likely to be obtained. By appropriate CFAR algorithm and parameter selection as is currently done in the ES-CFAR Processor, a higher level of ECCM effectiveness is likely to be obtained against many ECM threats.

With the application of an expert system to radar signal processing, demonstrated performance gains have been made possible through the combined use of symbolic and numeric processing. By combining techniques to assess the interference environment and select the most appropriate algorithms, improved detection probability and false alarm control have been demonstrated in regions of dynamically changing clutter. The next step is to integrate expert systems technology into adaptive space and time signal processing. Given the successful application to CFAR processing described above, effort should focus on applying these techniques to adaptive filtering, the process immediately preceding CFAR detection processing. Significant areas of impact are adaptive MTI filtering, adaptive Doppler processing, and joint adaptive spacetime processing. These are means by which radar returns are processed to separate target energy from interference, thus transforming the detection problem from a subclutter visibility domain to a superclutter visibility domain. These methods are powerful in their own right, but each suffers strengths and weaknesses. Combined with an assessment of the interference environment, this can be exploited to select the most appropriate space and time processing algorithm to extract target energy, in conjunction CFAR detection processing.

In an effort to achieve very high subclutter visibility, radar designers must strive to closely match the combined space and/or time filtering method and CFAR detection processing technique to the characteristics of the target and interference environment. The characteristics of both the target and the interference have a major impact on parameters such as required degrees of freedom, coherent dwell time, and average sidelobe level. For example, improved adaptive filter performance in a non homogeneous clutter environment may be achieved through the application of a variety of numerical techniques for secondary data analysis, providing for the formulation of more accurate covariance matrix estimates. Alternatively, an automatic technique for the selection of the most appropriate window function, to be applied to the measurement data prior to non adaptive filtering, will significantly improve performance in less severe interference environments. An expert system radar signal processor will be developed that implements a library of algorithms for adaptive and non adaptive angle-Doppler filtering (including secondary data selection) and false alarm control, which are intelligently selected based upon an assessment of the clutter and jammer environment.

Although a large amount of research and development of adaptive processing has been conducted in the past two decades, its application to airborne Doppler processing faces the following two challenges. First, the severely non homogeneous and non stationary airborne clutter environment demands a very fast convergence rate or the adaptive processor may degrade the CFAR detector performance. A new adaptive Doppler processor called Doppler Domain Localized-Generalized Likelihood Ratio (DDL-GLR) has been developed which has a high potential to offer E-3A and E-2C systems a significant performance improvement. The DDL-GLR processor has a very fast convergence rate with an embedded robust CFAR, and it is computationally very efficient, realizable with an add-on parallel processor and compatible with the existing E-3A and E-2C Doppler processors. The environment assessment features of the ES-CFAR can effectively help the DDL-GLR for the selection of its Regions of Detection Improvement (RODI) as well as determine the right size of the training data set.

A prototype expert system CFAR Processor has been presented which applies artificial intelligence to CFAR detection processing. By assessing the radar interference environment and selecting the most appropriate CFAR algorithm for performing detection processing, a significant performance improvement can be obtained. Dramatic improvements in detection and false alarm probabilities over a conventional CA-CFAR baseline processor have been demonstrated using both simulated data and measurement data from the E-3A. The potential applicability of the ES-CFAR technology to the E-2C was also discussed as was its applicability as a more robust and effective ECCM technique.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An artificial intelligence system for suppressing false alarms in data of interest, and which comprises:

a stored library of CFAR models; wherein said stored library of CFAR models comprises an electronic memory containing: a group of CFAR algorithms each with a set of varied parameters defining a set of cell averaging CFAR models (CA CFAR); a set of greatest of CFAR models (GO FARS); and a set of ordered statistic CFAR models (OS CFARS);

a sensor system which collects both said data of interest and environmental data;

a means for processing said environmental data from the sensor system to select a CFAR analysis model from said stored library of CFAR models; and a means for processing the data of interest from the sensor system with the CFAR analysis model to yield a set of CFAR processed data of interest in which false alarms are suppressed.

2. An artificial intelligence system, as defined in claim 1, wherein said sensor system comprises a host radar system which outputs radar return signals as said data of interest, and environmental information including atmospheric transmittance as said environmental data.

* * * * *